Patented Jan. 9, 1951

2,537,328

UNITED STATES PATENT OFFICE 2,537,328

MANUFACTURE OF AMINOGUANIDINE COMPOUNDS

George Reid Campbell, Saltcoats, Scotland, assignor to Imperial Chemical Industries Limited, a corporation of Great Britain No Drawing. Application March 9, 1948, Serial No. 13,942. In Great Britain May 21, 1947

7 Claims. (Cl. 260—564)

1

The present invention relates to improvements in the manufacture of an aminoguanidine salt from nitroguanidine.

Aminoguanidine, usually as a salt thereof, can be obtained by the reduction of nitroguanidine, which occurs in two stages, with the formation of nitrosoguanidine, as an intermediate product. The aminoguanidine is most conveniently isolated in the form of its bicarbonate, which is one of its least soluble salts in cold water. Sometimes, however, it is recovered in the form of aminoguanidine sulphate, which is also sparingly soluble in water. Both nitrosoguanidine and aminoguanidine are highly reactive compounds and the formation of aminoguanidine is usually accompanied by the formation of a substantial amount of guanidine and by considerable decomposition into gaseous products, so that the yields obtained in the reduction are liable to be poor and easily influenced by the conditions under which the reduction is carried out and under which the recovery of the product is carried out.

Amongst the methods that have been described in the literature for the preparation of aminoguanidine from nitroguanidine may be mentioned reduction with zinc dust in glacial acetic acid; reduction with zinc dust in presence of aqueous solutions of zinc acetate and other metallic acetates, or ammonium acetate, if desired in presence of metal salts having a catalytic action; electrolytic reduction; reduction with sodium amalgam in presence of liquid ammonia and ammonium chloride, and catalytic reduction with hydrogen under pressure in an appropriate solvent in presence of a nickel or platinum oxide catalyst. None of the hitherto described processes, however, is as convenient and economical as is desirable for employment on a commercial scale.

According to the present invention the process for the production of an aminoguanidine salt comprises progressively introducing zinc into a suspension of nitroguanidine in an aqueous solution of ammonium sulphate, maintaining the reaction temperature not above approximately 30° C., and mechanically separating the sludge formed during the reaction from the resulting solution of aminoguanidine sulphate.

The aminoguanidine salt thus formed may for example be isolated from the resulting solution as the aminoguanidine sulphate. It is preferable however to convert the aminoguanidine sulphate into aminoguanidine bicarbonate which is far the easier to isolate as it is much less soluble than the sulphate.

2

The reduction of the nitroguanidine is considered to reach completion when the presence of nitrosoguanidine, which is formed as an intermediate product during the process of the invention, is no longer evidenced in a test portion i. e. a red or violet colour is no longer obtained on the addition of ferrous sulphate and sodium hydroxide.

In accordance with a preferred embodiment of the invention the pH of the reaction mixture, which tends to rise as the reduction proceeds owing to the formation of aminoguanidine and ammonia, is maintained at approximately 7.5 by progressive introduction of an acid e. g. sulphuric acid, as the reduction proceeds. This has the effect of increasing the amount of zinc sludge and minimising the concentration of dissolved zinc products present in the reaction mixture after the reduction is completed, e. g. ammonium zincate, and thus facilitating the recovery from the solution from which the sludge has been mechanically removed of an aminoguanidine salt uncontaminated by zinc compounds.

Alternatively or preferably additionally, however, it is desirable so to treat the solution from which the zinc sludge has been removed that aminoguanidine bicarbonate is precipitated free from contamination by zinc compounds derived from any zinc compounds dissolved in the said solution. This is effected by the addition to the solution of ammonia and a soluble bicarbonate, the ammonia being used in amount at least sufficient to prevent any soluble zinc products in the solution from being precipitated as a basic zinc carbonate on the subsequent addition of the soluble bicarbonate.

In putting the invention into effect only a small excess of zinc need be employed, and zinc dust or other powder form of zinc is preferably used. The amount of ammonium sulphate is preferably present in amount chemically approximately equivalent to that of the zinc. The temperature at which the reduction proceeds is preferably not higher than 25° C. and if desired may be considerably lower. The zinc sludge retains a proportion of the aminoguanidine sulphate solution which may amount to 10% of the make, and it is convenient to wash this out with cold water and use the washings in making the nitroguanidine suspension for a subsequent preparation.

The yields of aminoguanidine bicarbonate obtained according to the invention range from about 75% to 80% of the theoretical, and the product may be obtained practically free from contamination by zinc compounds. The process is simple and convenient in operation as it does not necessitate the use of expensive apparatus or unusual or expensive reagents and is exceedingly economical in its consumption of the reagents employed.

The invention is illustrated in the following examples, in which the parts are parts by weight.

*Example 1*

96 parts zinc dust of 90% zinc content (3.3 mols.) are run in a slow stream over 1 to 1½ hours into a well stirred suspension of 42 parts nitroguanidine (1 mol.) in a solution of 100 parts ammonium sulphate (1.8 mols.) in 600 parts water including the washings of the oxidised zinc sludge from a previous preparation on the same scale, while maintaining the reaction mixture at a temperature between 5° and 25° C. with external cooling if required. When the presence of nitrosoguanidine can no longer be detected in a test portion by the red or violet colour obtained on addition of ferrous sulphate and sodium hydroxide, the reduction to the aminoguanidine stage may be regarded as complete. The zinc sludge is filtered off and washed with portions of cold water, which are used in making the nitroguanidine suspension for a succeeding preparation. 15 parts of ammonia liquor of specific gravity 0.880 and 60 parts sodium bicarbonate are successively mixed into the filtrate from the sludge. Aminoguanidine bicarbonate is thereby precipitated in 76 to 78% of the theoretical yield.

*Example 2*

The quantities of zinc dust, nitroguanidine, ammonium sulphate and water are the same as in Example 1 and the reduction is conducted in the same manner except that after some of the zinc has been run in the dropping of 98% sulphuric acid into the reaction mixture is commenced and is maintained at such a rate that the pH of the reaction mixture is kept at approximately 7.5 during the running in of the rest of the zinc dust. The suspension is filtered after the completion of the reduction and the zinc sludge is washed and the washings are utilised as described in Example 1. The aminoguanidine bicarbonate precipitated from the filtrate as described in Example 1 is found to be almost entirely free from zinc compounds. The yield is 77–79% of the theoretical.

I claim:

1. A process for the production of an aminoguanidine salt which comprises progressively introducing zinc into a suspension of nitroguanidine in an aqueous solution of ammonium sulphate, maintaining the reaction temperature not above approximately 30° C., permitting the reaction solution to progress to an alkaline pH during the reaction, and mechanically separating the sludge formed during the reaction from the resulting solution of aminoguanidine sulphate.

2. A process as claimed in claim 1 wherein the aminoguanidine salt is isolated as aminoguanidine sulphate from said resulting solution.

3. A process as claimed in claim 1 wherein the aminoguanidine salt is isolated as aminoguanidine bicarbonate from said resulting solution.

4. A process as claimed in claim 1 wherein the quantity of ammonium sulphate in the aqueous solution of ammonium sulphate is chemically approximately equivalent to the quantity of zinc added.

5. A process as claimed in claim 1 wherein the pH of the reaction mixture is maintained at approximately 7.5 by progressive introduction of sulphuric acid as the reduction proceeds.

6. A process as claimed in claim 1 wherein ammonia and a soluble bicarbonate are added subsequent to the removal of the sludge from the solution of aminoguanidine sulphate, the ammonia being used in amount at least sufficient to prevent any soluble zinc products in the solution from being precipitated as a basic zinc carbonate on the subsequent addition of the soluble bicarbonate.

7. A process as claimed in claim 1 wherein the aqueous solution of ammonium sulphate is made with the washings obtained by washing the zinc sludge with cold water.

GEORGE REID CAMPBELL.

REFERENCES CITED

The following references are of record in the file of this patent:

UNITED STATES PATENTS

| Number | Name | Date |
|---|---|---|
| 1,948,330 | Calvert | Feb. 20, 1934 |
| 1,990,511 | Wyler | Feb. 12, 1935 |
| 2,146,188 | Kerone | Feb. 7, 1939 |

OTHER REFERENCES

Sabetta et al.: "J. Am. Chem. Soc.," vol. 57 (1935), pp. 2478–2479.